INVENTOR
Thomas Michels

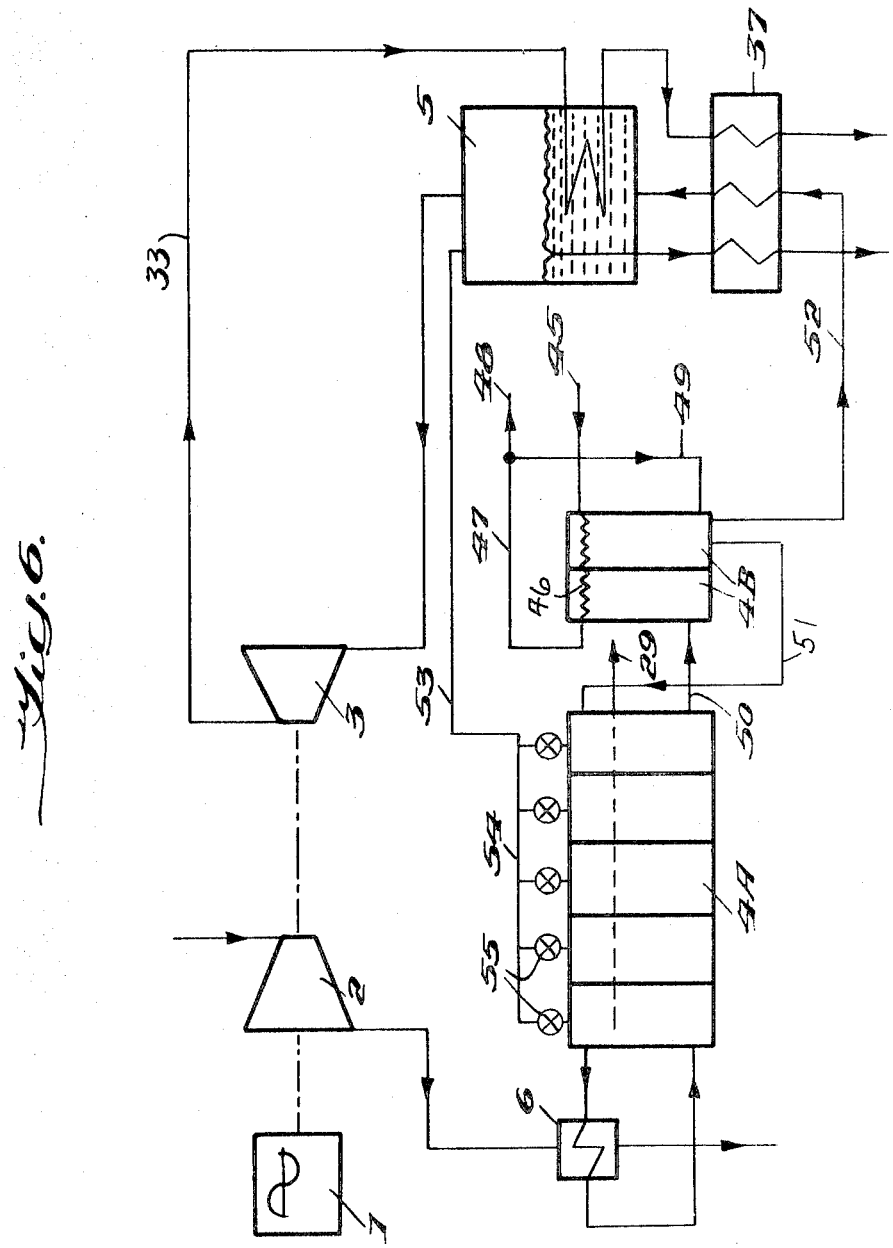

United States Patent Office 3,597,328
Patented Aug. 3, 1971

3,597,328
COMBINED PLANT INSTALLATION FOR PRODUCING ELECTRICAL POWER AND FRESH WATER FROM BRINE
Thomas Michels, Maisons-Laffitte, France, assignor to Compagnie Electro-Mecanique, Paris, France
Filed Nov. 7, 1968, Ser. No. 774,098
Claims priority, application France, Nov. 15, 1967, 128,266
Int. Cl. B01d *3/06, 3/10*
U.S. Cl. 202—173     14 Claims

ABSTRACT OF THE DISCLOSURE

Combined installation for the production of fresh water and electricity comprises an electrical generator unit which produces electric power from heat energy such as a steam turbine. The turbine also drives the compressor unit of a compression-evaporator producing fresh water from brine and the heat rejected by the electrical generator unit is utilized in an evaporator-distiller likewise producing fresh water from brine supplied to it.

---

The present invention relates to combined or "mixed" installations for production of fresh water and electricity. Hereinafter we will call distilled water fresh water, and salt waters (brackish water, sea water, brine) which permit the preparation of this fresh water.

Independent installations producing water on the one hand, and electricity on the other, have a certain number of drawbacks. To avoid these there have already been proposals for mixed stations producing water and electricity. But these mixed stations have other drawbacks.

The most highly developed installations producing fresh water comprise, on the one hand, "evaporator-distillers" (such as "multi-flash" evaporators, with simple or multiple effect, evaporators with long vertical tubes, with multiple effect) in which the energy necessary for operation is brought exclusively in the form of heat, and on the other hand, "compression evaporators" in which, aside from any additions of heat, the principal energy is furnished in mechanical form. By reason of the risks of scale and corrosion in such installations, the maximum temperature of the brines are on the order of 100 to 120 deg. C.

The drawback of these installations resides in the fact that the sources of heat, for example the boilers, could deliver the necessary heat at a much higher level than that at which the heat is used, which makes for high energy consumption in independent water production installations.

In spite of this drawback, "evaporator-distillers" are now the most commonly used industrial devices producing fresh water from brines, and have been the subject of many improvements, such as, for example, the recycling of brine, the multiplicity of effects, the regulation of the production of fresh water or of the operating temperatures by varying the flow of recycled brine, the various treatments for prevention of scale, etc.

Compression evaporators, which are less common, in which the stream is compressed before being condensed have also been improved. These compression evaporators can comprise one or more exaporation chambers which can be put in parallel or in series. In the latter case, the evaporator can be, for example, a multiple expansion evaporator, utilizing the steam compressor as a "heat pump." The compressed steam condensation tube bundle can be inside one or more of the evaporation chambers, or the compressed steam can condense in a condenser outside the evaporation chamber(s), this condenser being used for heating brines.

In these compression evaporators, in order to arrive at suitable levels of temperature and evaporation pressures, and thereby of the vapor to be compressed, without at the same time losing too much heat, a system of heat exchangers can be placed for transferring heat from the fresh water and brine extraction circuits to the brine feed circuits, so that a part of the heat from the extraction flows will serve to heat the feed flow.

The compressors of the compression evaporators are now driven by any adequate means, such as, for example, electric motors, steam or gas turbines, etc.

But one knows of the great difficulty represented by the stabilization of the operation of compression evaporators, and the often uneconomical means of regulation of operation by direct regulation of the flow of the steam compressed by the compressor. The flow regulation can be achieved by disposing regulating means on the intake or discharge ducts of the steam compressor. We can also envisage, for regulation of the flow of compressed steam, the use of compressors whose characteristics can be changed while in operation, for example, by the use of orientable vanes, adjustable in operation. All these known means of regulation and stabilization of the flow of compression evaporators do not provide full satisfaction, and are delicate to apply.

Furthermore, electrical generating stations comprise machines which serve to transform heat energy into mechanical energy, giving off large quantities of heat at various temperature levels. There have, therefore, already been proposals, inasmuch as evaporator-distillers use heat at a relatively low level, for coupling electrical production installations to water production installations constituted by evaporator-distillers, at the price of more or less reducing the production of electricity in the mixed production installation.

But the embodiment of mixed production installations of this type encounters serious drawbacks in operation, owing to the following considerations:

By reason of the conditions of coupling or association of the two parts of such an installation, the electrical production one and the water production one, there is, for each coupling of a given heat machine and a given evaporator-distiller, only a small margin for an economical choice of the nominal ratio of production of electricity and water in the case of known mixed installations. This nominal ratio of kwh. per m.$^3$ is of no interest in many cases, because it is relatively high for known mixed generating stations.

Furthermore, the lack of adaptability, and in particular of an instantaneous adaptation of the production ratio, to demands for electricity and water in the case of known mixed production installations, arises as a serious drawback because, in actual fact, the ratio of demands for electricity and water vary widely in time.

Although, as a matter of fact, electricity demand varies in time, it is important, from the point of view of energy and economics, to keep the water production constant and optimal, because water can easily be stored. But variations in outside demand for electricity, which are rather extensive in time, require an adaptation of the power in the electrical generating portion of such installations. The means of varying the power of the heat machines, hence the production of electricity, which are well known, of course, such as, for example, regulation of the flow or the characteristics of the steam at the intake to the steam turbine, often involve, by reason of the heat coupling between the heat machine and the evaporator-distiller, variations in the production of the evaporator-distiller as well, which then differs widely from optimal conditions.

Variations in the two productions (electricity and water) are translated by variations in the overall output of the installation which will then, obviously, average less than average the optimal output. From all this, the drawbacks of mixed electricity and water production installations are clear; either these generating stations must operate, in order to insure high efficiency, with constant water and electricity production, that is to say that the production of electricity cannot be adapted to the outside demand; or these mixed production stations, if they adapt their production of electricity to outside demand, have high production costs.

One of the objects of the present invention is the coupling of the elements of a mixed production station of electricity and water, which avoids the various drawbacks mentioned above.

According to the invention, the said association comprises a unit generating current from heat energy, whereof the energy drives the compressor of a compression evaporator fed with brine, while the heat rejected by the said unit is utilized in an evaporator-distiller, also fed with brine.

In a simple form of embodiment of the invention, the generating unit is constituted by one or more heat machines working as motors driving mechanically, at least one electric current generator, for example, an alternator.

Between the generating unit and the compressor, the linkage can be direct and mechanical; it can also be indirect and involve an energy convertor. In particular, this linkage can be electric, that is to say that current from the generator can be utilized to drive the compressor of the compression evaporator and permit a separation in space, of the installation, into two parts, each comprising an evaporator.

But, as will be demonstrated below, the two evaporators can advantageously be combined, associated or integrated to allow optimal efficiency at all times.

With the mixed stations according to the invention, it is possible to provide any nominal ratios of kwh. per m.$^3$ in the range below the corresponding to known mixed stations.

Moreover, another object of the invention is to give the above mentioned mixed production installation, in order to counteract the lack of instantaneous adaptability in known mixed installations, the possibility of easy, instantaneous adaptation of the ratios of production of water and electricity to outside demands for electricity, by varying the division of the power, delivered by the motor element, between the other energy transforming elements, which are energetically coupled to the motor element, in such a way that the total power to the said motor element will vary little and this will enable it to run with constant output. In other words, in the said mixed production installation according to the invention, the available power, not utilized for the production of electricity, is passed on to the steam compressor of the compression evaporator, whose production will then vary in time, implying that the power absorbed by the vapor compressor is regulated as a function of the charge of the alternator. This flexibility of adaptation of the mixed stations according to the invention makes it possible to envisage their utilization as "peak" generating stations, active when the current demand is maximum and highly variable.

Still another object of the invention resides in the means for obtaining this variable division of the power of the motor element between the other elements of transformation, in particular between the current generator and the compression evaporator, that is to say the means for regulating the power of the compressor as a function of that of the alternator.

With this in mind, according to a feature of the present invention, advantageously applicable to mixed installations, but which can also be used by itself for regulating the output of a compression evaporator used alone, the evaporating chamber of a compression evaporator comprises connecting channels, with controlled opening, with at least two distinct spaces in which there prevail, in equilibrium, pressures which are respectively lower and higher than the operating pressure of the said evaporation chamber.

The method according to the invention, for regulation of the flow of a compression evaporator, then consists in connecting, for a limited time, the evaporation chamber of this evaporator with a space whose steam pressure is different from that of the said chamber.

If this space pressure is lower than the chamber pressure, the flow of steam sent to the compressor will diminish, and consequently the quantity of steam condensed will also diminish, lowering the temperature of the evaporation chamber, since the latter is heated, directly or indirectly, by condensation of the steam emerging from the compressor. Thus, the vapor tension of the evaporation chamber will diminsh, and the output of the compression evaporator will drop.

The reverse is true if one connects the evaporation chamber with a space of higher steam pressure.

The spaces with stabilized steam pressure serving to regulate the production of the compression evaporator can be independent and established according to need. But these spaces are preferably the compartments or stages of an evaporator-distiller which can be the first evaporator in a mixed installation according to the invention.

One thus obtains graduation in value of pressures, which permits very precise regulation of the compression evaporator.

The following description with reference to the attached drawing, given by way of non-limiting example, will make it easy to understand how the invention can be embodied; the features appearing both in the drawing and the text are, of course, part of the said invention.

FIG. 6 is a sketch in which the two evaporators of an installation according to the invention are combined.

Figure 1:
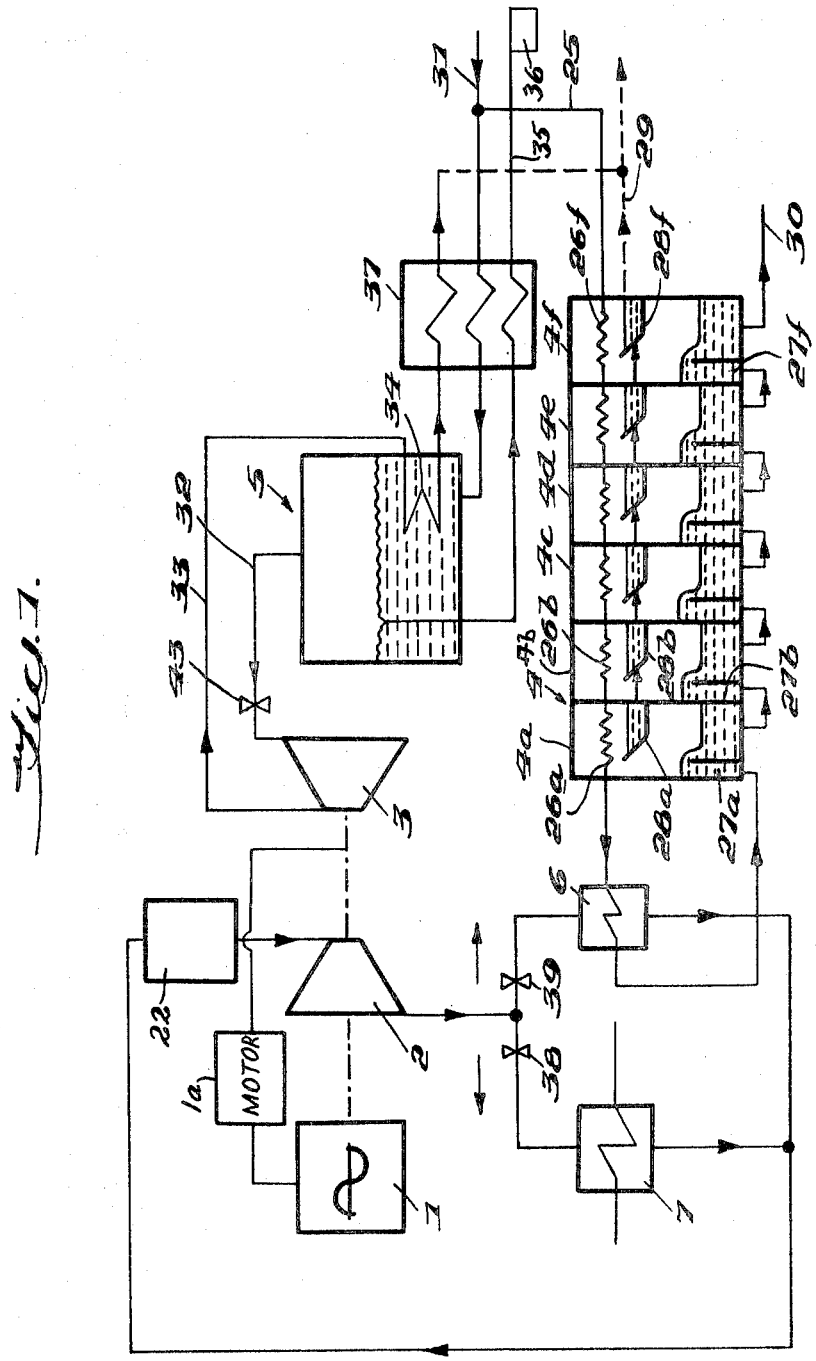
FIG. 1 is a schematic representation of a simple form of mixed installation according to the invention.

In FIG. 1, a steam turbine 2, for example, a back-pressure type, drives on the one hand an alternator 1 and on the other hand a steam compressor 3. These three elements are linked either by direct connection or by means of speed reducers or multipliers.

The evaporator-distiller designated as a whole by reference 4, is connected thermally by means of a condenser-heater 6, to the steam turbine.

The steam compression evaporator comprises evaporation chamber 5 and steam compressor 3. In a manner known in itself, the evaporator-distiller 4 is divided into a series of compartments or stages 4a to 4f, for example, wherein the temperature and internal steam pressure decrease from left to right.

Cold brine (sea water) enters through duct 25 and passes successively into coils 26f to 26a.

The emerging water is further raised in temperature (5 to 10 deg. C. for example) from passage in condenser 6, after which it repasses, as a free film, successively through compartments 4a to 4f, being expanded through devices 27 each time.

Thus, in each compartment, steam condenses in contact with coil 26 in this compartment, and falls into a collection tank (28a to 28f). All these tanks are connected together by head-loss ducts so that the fresh (distilled) water product from the evaporator-distiller 4 is collected at 29.

In this embodiment, the heat of steam condensation is recovered intact for vaporization and heating; and condenser 6 furnishes only the difference in heat needed for this operation.

In evaporation chamber 5 of the compression evaporator, the brine arrives through duct 31, the steam is taken off through duct 32 and sent to compressor 3 which compresses and heats it (likewise 5 to 10 deg. C. for example), so that this steam passing through return duct 33 can, as it condenses, serve to heat and evaporate, by coil 34, the brine contained in evaporation chamber 5.

The excess concentrated brine is evacuated through duct 35 to overflow 36. As before, a heat exchanger 37 heats the brine admitted by the concentrated brine and distilled water taps.

In FIG. 1, however, the usual accessories of known evaporators, such as the ducts for extraction of non-condensable gases from the condensors, and expansion chambers, the separate desgasifiers if any, the pumps, etc., have not been included.

The turbine 2 has substantially constant power. The flux of heat delivered by the condensation of exhaust steam from this turbine 2 into heater 6, therefore varies little, and consequently the production of distillation element 4 is practically constant.

In order to allow the installation to operate in case evaporator-distiller 4 is shut down, an auxiliary condenser 7 can be provided. Passage into condensers 6 or 7 is controlled by valves 38 and 39. This condenser has the advantage of permitting the mounting, where the case applies, of a means of regulation of distillation element 4, by varying the flux of heating heat into heater-condenser 6. Below, it will be shown that condenser 7 can also be utilized for regulation of the compression evaporator.

Turbine 2, functions under practically constant load, and it can be advantageous at least for power stations of a certain size, to endeavor to insure as high an efficiency as possible to the turbine cycle, by giving it every possible improvement, such as, for example, high steam characteristics, multiple taps and resuperheats, etc.

Figure 2:
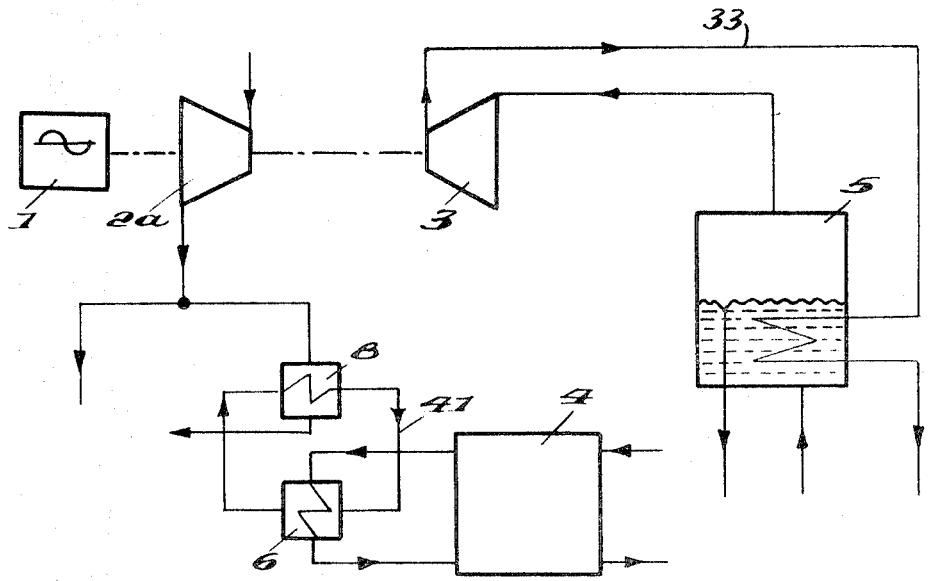
FIG. 2 shows a variation of such an installation.

In the variation of embodiment shown by FIG. 2, the heat machine is a gas turbine 2a. The other two elements are, as before, an alternator 1 and a steam compressor 3.

The heat linkage of turbine 2a and evaporator heater 6 is insured by an intermediate fluid, for example, distilled water, thanks to a recovery boiler 8 which feeds exchanger 6 by circuit 41.

The gas turbine shown in FIG. 2 can be replaced by other heat machines, for example, explosion or internal combustion motors, such as diesel motors or even more complex heat assemblies involving, for example, generators of compressed gas. It is to be noted that unit 1–2 could also be constituted by a generator of the plasma type, for example, in which electric energy can be extracted directly from heat energy.

One also can, of course, replace the evaporator-distiller 4, linked thermically to the generator unit 1–2, by other evaporators, working in reflux and by expansion, such as, for example: multiple expansion, so-called multi-flash evaporators; multiple effect evaporators, such as evaporators with long vertical tubes, etc.

Likewise compression evaporator 3, 5 can be of a different, more complex and more perfect design than the one illustrated.

With the power of the heat machine 2 remaining constant, it is well to permit an adjustable distribution of this power between the alternator 1 and compressor 3 as by a motor 1a (FIG. 1).

With this in mind one can use, for example, a regulator valve 43 (FIG. 1) for the flow picked up by the compressor, but this expedient entrains an obvious loss of efficiency. One can embody this regulation of power of the steam compressor in other ways by going after various properties, for example, the response time, the thermodynamic efficiency, and the minimal disturbances of operation of one or more parts of the installation involved.

From the point of view of response time, it is well to have available, two kinds of means of regulation: one slow, which, thermodynamically speaking, should be made as reversible as possible, and the other fast, which can have low energy efficiency. As a matter of fact, although average electric power varies slowly, peak or auxiliary demands can cause abrupt variations in the demand for electricity, and it can be very important to be able to supply the electric distribution grid with all the power of the station for an extremely brief time, for example, a few tens of seconds. Valve 43 can be used for this purpose.

Figure 3:
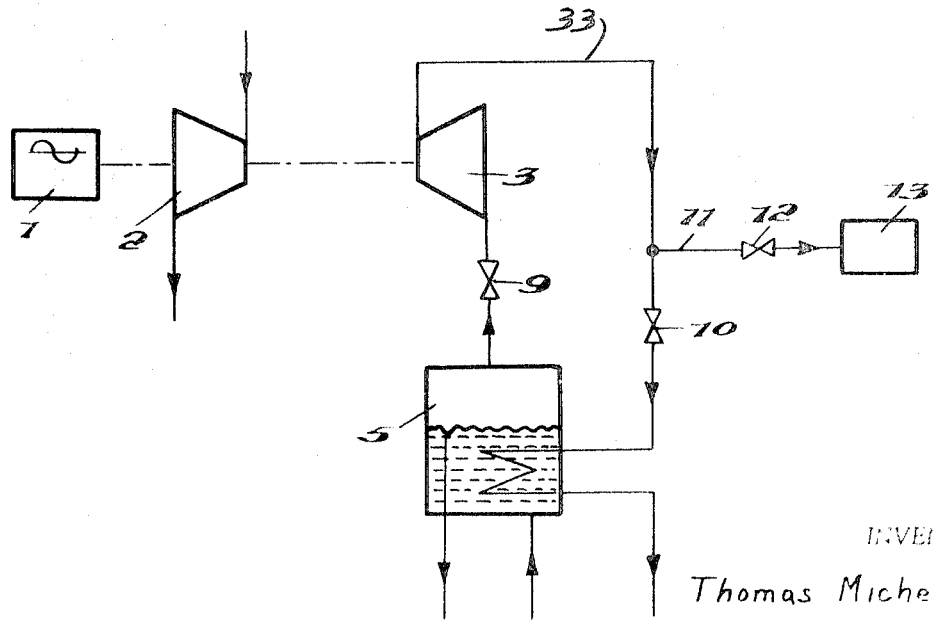
FIGS. 3 to 5 are sketches illustrating means of regulation of the installation.

One can also insure (FIG. 3) a fast reduction in the power absorbed by the steam compressor by two stopping devices 9 and 10, placed respectively on the intake and exhaust ducts of steam compressor 3, and by a supplementary duct 11 which comprises likewise a stopping device 12, and which connects the discharge duct of the compressor, above the stopping device 10, to a reduced-pressure space 13. Duct 11 serves to evacuate any leaks from the two stopping devices mentioned above, and to put the compressor at a pressure whose absolute value depends on that of space 13, and which can be very low. This fast regulation makes it possible to reduce, in a period of a few seconds, the power absorbed by the steam compressor to a minimal value, and thus to make available to the electricity distribution grid, the full electric power of the installation (which can be appreciable) in a very short lapse of time. Space 13 can be a condenser space, and in particular, one of the low-pressure compartments of the evaporator-distiller 4.

When an abrupt variation in power is not wanted, one can insure the variation of the power absorbed by the compressor 3, and more generally regulate the flow from a compression evaporator by regulating the temperature of the steam drawn in by this compressor, that is to say the temperature prevailing in the evaporation space of the compression evaporator in which the said compressor aspirates. This temperature will be called, hereinafter, the "operating temperature" of the compression evaporator. This method of regulation profits by the fact that the efficiency per unit of mass compressed by the compressor, hence the power absorbed by this compressor, depends on the specific volume of the steam or gas drawn in the compressor. As in a compression evaporator, the specific volume of the steam aspirated by the compressor is linked, by means of the saturation pressure, to the operating temperature, and, as this volume varies quite rapidly with the latter, one can indeed regulate the power of the compressor by regulating the operating temperature of the compression evaporator.

Regulation of the operating temperature can be obtained in several ways. Among others, it is possible to regulate this temperature by regulating that of the evaporator brine feed flow (duct 31 FIG. 1), for example, by more or less by-passing heaters 37 of the feed flow(s). This method of regulation is slow. It can be made faster if one provides the possibility of a massive input of cold water in the evaporator. Inversely, it is also possible to regulate this temperature by an addition of heat to the evaporator, for example, by electric heating or by one or more surface exchangers fed by a heating fluid. But these methods of regulation are generally harmful to the energy consumption of the installation.

Figure 4:
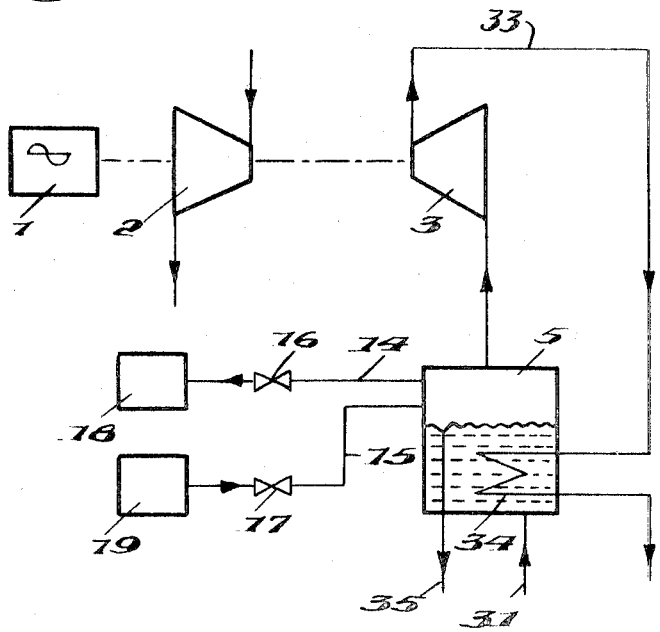

One method of regulating the operating temperature of a compression evaporator, that is more effective and more efficient (FIG. 4) consists in connecting the evaporation chamber(s) 5 in which the compressor aspirates, by one or more ducts 14, 15, to a corresponding number of spaces 18, 19 in which steam pressures, imposed by any means, prevail. The linking ducts comprise regulator valves 16, 17.

If the evaporation chamber 5 is connected with a space 18 which is at a pressure lower than that of the evaporation chamber, a flow of steam is established in the direction of this reduced pressure space, and the pressure, hence the temperature in evaporation chamber 5 will fall. The power absorbed by steam compressor 3 will also drop, and this drop remains because coil 34 will bring less steam into chamber 5 and the latter will cool. But if evaporation chamber 5 is connected with a space 19 which is at a pressure higher than that in evaporation chamber 5, the temperature therein will rise, the power absorbed by the compressor 3 will also rise, and the rise in production of fresh water will remain as before owing to the heating of the chamber 5.

One can also embody slow or fast regulations, as a function of the differences in pressure between the evaporation chamber and the spaces and the sections of passage of the ducts connecting the evaporator to those spaces. As spaces which can be connected with the evaporation chamber, one can envisage, among others, auxiliary condensers, feed ducts or steam taps from a turbine, etc. To be able to achieve, according to the invention, a slow regulation with good thermodynamic efficiency, it is well to select spaces with temperatures and pressures close to those one desires to obtain in the evaporation chamber of the compression evaporator. A particularly advantageous solution, as set forth below, consists in using, as space 18, 19, the compartments of an evaporator-distiller and especially of evaporator 4.

Figure 5:
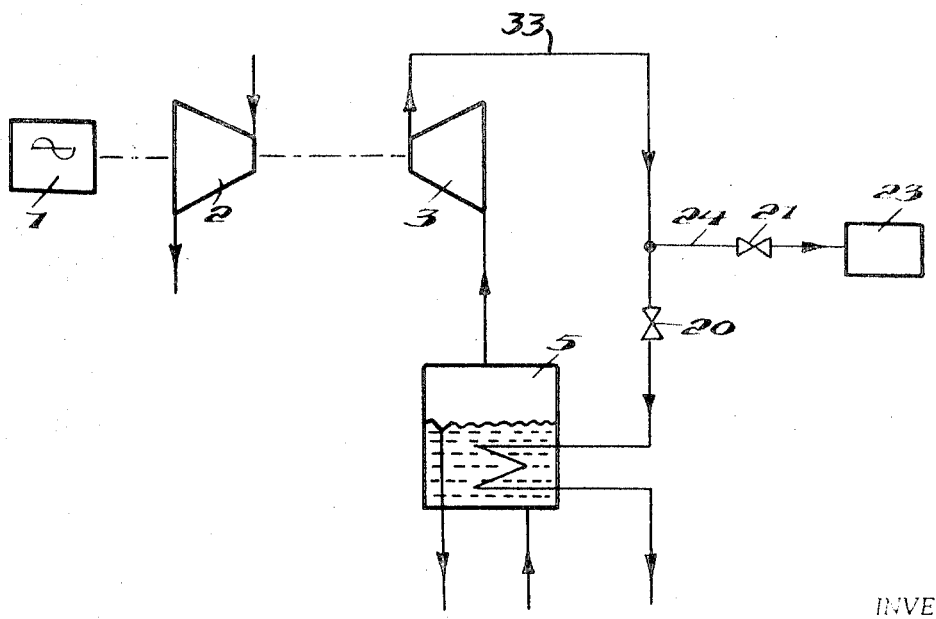

Regulation of the temperature of a compression evaporator can also be obtained (FIG. 5) by connecting the discharge duct 33 of compressor 3 to a space 23 which is at a pressure lower than that at which the compressor is discharging. The connecting duct 24 has a flow regulating organ 21; a stopping device 20 is provided on the discharge duct from the compressor below the start of the connection 24 with the low-pressure space 23. By actuating the regulating organ 21 and the stopping device 20 in a rather rapid manner, it is possible to reverse the pressure conditions in such a way that the pressure at the intake of the compressor is higher than at the discharge, and that for a limited time, compressor 3 could deliver pressure instead of absorbing it. In particular, space 23 can be a condenser such as 7 (FIG. 1) which is not used in normal operation.

Thus, evaporator 5 becomes momentarily a "boiler" and compressor 3 a "turbine."

This method of regulation, utilized in this form, therefore makes it possible to create a very short response time, and to supply the electrical distribution grid with the full electrical power of the installation, which gives the latter the function of a peak load station.

A slower actuation of devices 20 and 21, perhaps made more efficient by being connected in series with the stopping device 20 of a regulating device, can permit a slower regulation of the operating temperature of the compression evaporator, and hence can permit the slow regulation of the power absorbed by the steam compressor.

We can further improve mixed water and electricity producing installations, embodied according to the invention, by thermically coupling the distillation element, linked to the motor element, and the distillation element linked to the compressor, or by more or less integrating the two distillation elements in one another.

Such a coupling, already evoked above, consists, for example, in choosing as space 13 (FIG. 3) 18 or 19 (FIG. 4) or 23 (FIG. 5), compartments of the evaporator-distiller.

One can also take, as evaporation chamber of the compression evaporator, any one of the evaporation chambers—or expansion chambers in the case of a multi-flash evaporator—of the evaporator coupled with the heat machine.

One can also replace all or part of the exchangers 37 by stages of the evaporator-distiller coupled with the heat machine.

It is likewise possible to couple brine circuits of the two distillation elements, as shown in FIG. 6, for example.

The evaporator-distiller in this case will comprise, in known fashion, two parts 4A and 4B. By means of duct 45, cold brine is admitted to coils 46 in part 4B. Duct 47 is divided into two branches, one, 48, evacuating an excess of heated water, the other, 49, bringing heated brine into the last compartment of part 4B, which brine is degasified in this compartment.

Thus, the concentrated brine returning from part 4A through duct 50 is diluted to an acceptable concentration, so that the brine in the last compartment of 4B can be sent on the one hand through duct 51 to the evaporator part 4A, and on the other hand through duct 52 into chamber 5.

One advantage of this coupling of the brine circuits is a substantial reduction of the energy needed to degasify these brines, because, with this object, for the whole of the installation, one will treat only the additional flow brought by duct 49. Likewise one treats only this additional flow for scaling.

FIG. 6 also shows a duct 53 which, by means of manifold 54 and valves 55, can be connected with any one of the compartments in part 4A of the evaporator-distiller.

One important advantage of the present invention is that is permits a better utilization of mixed installations, by programming cycles of regulation of the power of the steam compressor, as a function of the cycles of variations in production of electricity in time, with a view to maximum use of the means of slow regulation as set forth. We can thus insure the most perfect stability possible in the compression evaporator with an installation like the one shown in FIG. 6, owing to the fact that the evaporators, which can be coupled with the heat machine, such as, for example, the multi-flash evaporators 4A, offer a scale of pressures which is rather well filled by reason of the large number of stages or compartments, and which is very stable.

As a matter of fact, this makes it possible to have, in every case, as spaces with a given pressure, used for the said slow regulation, spaces which are at pressures close to the saturation pressures corresponding to the operating temperatures of the compression evaporator, which is favorable to the energy consumption of the unit as a whole.

I claim:

1. A combined plant installation for producing electrical energy and fresh water from brine in variable amounts, comprising means for producing heat energy at a substantially constant output level, turbine means for converting a first portion of said heat energy into electrical energy, a first distillation unit including a vapor compressor and an evaporator unit in communication with said vapor compressor for converting brine into fresh water, means for utilizing a second portion of said heat energy to drive said vapor compressor, a second multi-stage distillation unit having a plurality of connected compartments, means utilizing the remaining portion of said heat energy for operating said second distillation unit to convert brine into fresh water and means for varying the proportions of said heat energy supplied to said turbine means, to said first distillation unit and to said second distillation unit whereby the substantially constant level of heat energy produced may be effectively used at all times and particularly in the event of a decrease in the amount of energy consumed in the conversion thereof to electrical energy.

2. A combined plant installation as defined in claim 1 and further comprising a generator driven by said turbine, means for generating the electrical energy, said turbine means also serving to drive said vapor compressor.

3. A combined plant installation as defined in claim 1 and further comprising a generator driven by said turbine, means for generating the electrical energy and an electrical motor powered by said generator coupled to said vapor compressor for varying the utilization of heat energy supplied thereto.

4. A combined plant installation as defined in claim 1 and further comprising means for regulating the flow of vapor through said compressor.

5. A combined plant installation as defined in claim 4 wherein said flow regulating means for said compressor includes obturating means in the inlet and outlet ducts of said vapor compressor, and further comprising a low pressure space and a branch duct including valve means connecting said outlet duct and said space.

6. A combined plant installation as defined in claim 1 and further comprising means for regulating the operating temperature of said evaporator unit whereby the heat energy utilized by said vapor compressor may be regulated.

7. A combined plant installation as defined in claim 1 and further comprising at least two groups of spaces in which steam pressures prevail in equilibrium and which are respectively higher and lower than the normal operating pressure of said evaporator unit and means for selectively connecting one of said groups of spaces with said evaportaor unit.

8. A combined plant installation as defined in claim 7 wherein said group of spaces is constituted by compartments of said second distillation unit.

9. A combined plant installation as defined in claim 1 and further comprising means for feeding a part of the brine from said second distillation unit to said evaporator unit.

10. A combined plant installation as defined in claim 1 wherein said evaporator unit constitutes a compartment of said second distillation unit.

11. A combined plant installation as defined in claim 1 and further comprising a heat exchanger and means for feeding the discharge from said turbine to said heat exchanger for supplying heat for operating said second distillation unit.

12. A combined plant installation as defined in claim 1 and further comprising a heat exchanger for feeding heated brine to the evaporator unit, said heat exchanger being constituted at least in part by at least one compartment of said second distillation unit.

13. A combined plant installation as defined in claim 1 and further comprising a cut off valve in the outlet duct from said vapor compressor and a space at a lower pressure than that prevailing in said evaporator unit connected to said outlet duct preceding said cut off valve.

14. A combined plant installation as defined in claim 1 and further comprising a heat exchanger containing a separate fluid, the discharge from said turbine being fed to said heat exchanger and supplying heat to said separate fluid which supplies heat in turn to said second distillation unit.

References Cited

UNITED STATES PATENTS

| | | | |
|---|---|---|---|
| 3,412,558 | 11/1968 | Starmer | 203—11 |
| 3,243,359 | 3/1966 | Schmidt | 203—10 |
| 3,213,001 | 10/1965 | Schmidt | 203—10 |
| 2,781,635 | 2/1957 | Brogdon | 202—SWC |

NORMAN YUDKOFF, Primary Examiner

D. EDWARDS, Assistant Examiner

U.S. Cl. X.R.

203—11, 24, 26